United States Patent [19]

Gates, Jr.

[11] 3,922,641

[45] Nov. 25, 1975

[54] AUTOMATIC VIDEO AND AUDIO SOURCE SELECTOR FOR ENTERTAINMENT CENTER

[76] Inventor: William A. Gates, Jr., 3228 E. Delcoa Drive, Phoenix, Ariz. 85032

[22] Filed: Dec. 11, 1974

[21] Appl. No.: 531,620

[52] U.S. Cl. ........ 340/147 LP; 328/154; 340/147 C

[51] Int. Cl.[2] ..................... H04Q 3/00; H03K 17/00

[58] Field of Search ............. 179/1 B; 178/DIG. 13; 340/147 P, 147 LP, 147 R, 147 C, 147 CN; 328/154

[56] References Cited

UNITED STATES PATENTS

| | | | |
|---|---|---|---|
| 3,675,205 | 7/1972 | Mereen et al. | 340/147 R |
| 3,688,262 | 8/1972 | Liquori | 340/147 R |
| 3,691,528 | 9/1972 | Calvagna et al. | 340/147 LP |

*Primary Examiner*—Donald J. Yusko
*Attorney, Agent, or Firm*—Warren F. B. Lindsley

[57] ABSTRACT

An automatic electronic control system for a home entertainment center, the system utilizing audio or video signal sensors for the preferential selection of a video tape reader as a signal source but with provision for returning to a video receiver upon the cessation of the signal from the preferred source. A manual mode is also provided which utilizes proximity switches.

13 Claims, 13 Drawing Figures

AUTOMATIC VIDEO AND AUDIO SOURCE SELECTOR FOR ENTERTAINMENT CENTER

BACKGROUND OF THE INVENTION

A wide variety of equipment is currently available for use in the home to provide high quality video and musical entertainment. The more recent home entertainment center of this type includes video-audio equipment in addition to the more commonly encountered stereo record players, magnetic tape decks and AM-FM tuners, all of which are selectably employed to drive a video-audio display, a dual channel amplifier and speaker system, or associated recording systems. A major disadvantage of such systems, however, is that their operation often becomes a nuisance for the operator because of the constant attention required by the complex combination of equipment. This is especially objectionable when the center is put to use as a means for providing unattended entertainment or background music at a social event when the host is busy attending to other matters. It would be a great convenience in such cases if the host could set the equipment in operation and then forget it, knowing that when all the recorded and preplanned video or audio tapes had run out, the equipment would automatically switch to the tuner or other preferred source and continue operating in that mode until he again had an opportunity to set up a new tape or stack or records.

SUMMARY OF THE INVENTION

In accordance with the invention claimed, an automatic selection system is provided for use with a home entertainment center, the system serving to greatly simplify the control of the system and relieving the operator of the need to give his constant attention to maintaining its operation.

It is therefore one object of this invention to provide an automatic control system for a home entertainment center of a type that typically includes a variety of audio and video-audio equipment including television receivers, tuners, tape recording and play-back instruments, phonographs and the like.

Another object of this invention is to provide in such an automatic control system a high degree of convenience in terms of the operator's ability to select an operating mode or signal source simply by touching a lighted spot on the face of the equipment panel.

A further object of this invention is to provide in such a system a capability for the system to select automatically an audio signal from a video-audio tape or from other preferred source when such a signal is present and to return automatically to a television receiver or audio tuner at the termination of the playing of a recorded program, the system responding in this case to the termination of the signal from the recorded program source.

A still further object of this invention is to provide in such a system a capability for allowing the operator to select either the automatic mode for the selection of the audio source or a manual mode which disables such automatic selection.

A still further object of this invention is to provide in such a system a front panel on which a lighted message appears as each of the operating modes or signal sources selected, the message indicating the selected mode and audio source.

Yet another object of the present invention is to provide in such a system a capability for utilizing a set of remote switches for duplicating at a remote location the same selection capability as provided at the front panel of the equipment.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawing, in which.

DESCRIPTION OF THE PREFERRED EMBODIMENT

Figure 1:
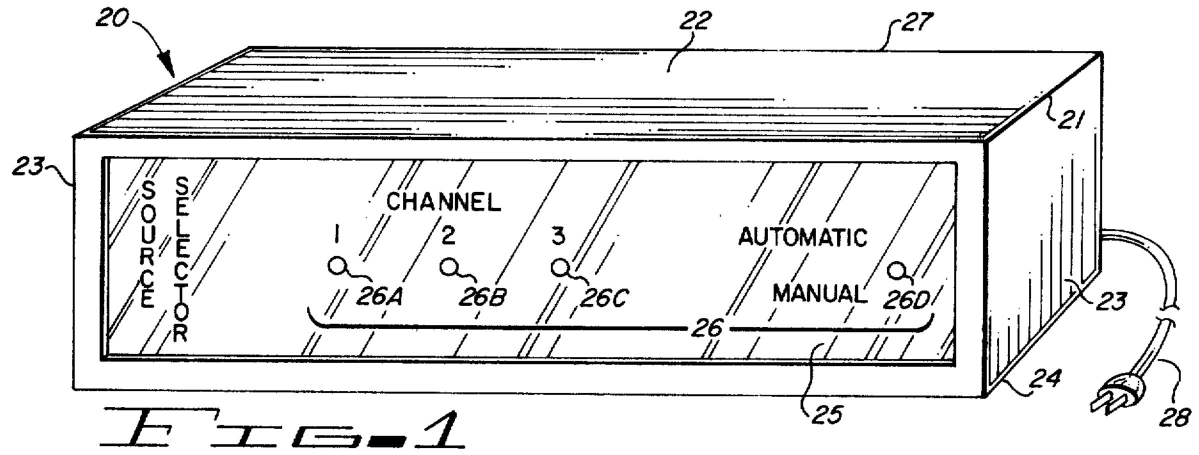
FIG. 1 is a perspective view of the automatic source selector embodying the present invention.

Referring more particularly to the drawing by characters of Reference, FIG. 1 discloses an automatic source selector unit 20 for use with a home entertainment center of the type typically comprising video-audio tape and receiving equipment in addition to strictly audio equipment such as a phonograph or record player, a tape unit, a tuner for AM and FM, an amplifier and a speaker system. The selector unit 20 which serves as a control center for such a system comprises a housing or cabinet 21 with top 22, sides 23 and bottom 24 fabricated from wood or other attractively furnished material and with a glass front 25.

The glass front 25 has an opaque black background which is broken by a number of captions in different colors. At the left of the panel is shown the trade name of the unit, as represented in FIG. 1, for illustration only by the name SOURCE SELECTOR. Arranged across the top of glass front 25 is the channel identification numerals, and at the right of panel 25, the caption AUTOMATIC directly above another and final caption MANUAL. While the black background is opaque, the captions are of transparent colors which are not visible unless lighted from behind the glass front 25 in which case they become readily apparent and easily recognized. Below each of the three channel identification numerals and directly to the right of the pair of captions, AUTOMATIC and MANUAL, there is a red light emitting diode (LED) 26 which is visible from the front of the panel when energized, there being appropriately located apertures in the black background of front 25 to pass the light from the LED's 26.

Across the rear panel 27 (hidden from view) of unit 20 are a number of terminals and jacks for making connections to the signal sources, to the amplifier and to remote controls. Also connected at the rear panel 27 is the a-c power cord 28.

When the unit 20 is connected to an a-c power source via cord 28 and when the video-audio and other equipment is connected at the rear panel 27, the unit 20 assumes control of the entertainment center.

When a-c power is first applied, unit 20 initially selects the preferred video-audio or other channel and switches into the automatic mode. In this mode only the four captions, SOURCE SELECTOR, CHANNEL, selected numeral, and AUTOMATIC will be illuminated and visible in green and only the LED's 26A, 26C and 26D associated with the unselected numerals and with AUTOMATIC/MANUAL will be energized and visible in red. Assuming source 2, which might be a TV receiver has been energized, a signal from source 2 will be transmitted by the unit 20 to the video display and/or speaker system.

If the video tape source or an audio tape unit is subsequently set into operation, the unit 20 recognizes a signal from either of these units, automatically assigns priority to such a signal and switches from the receiver signal to the video-audio or audio tape signal, transmitting that signal to the amplifier, video display and speaker system. Simultaneously with the selection of the higher priority signal, the appropriate numeral 2 or 3 becomes visible and the numeral 2 becomes invisible while LED 26A or 26C is extinguished and LED 26B is energized. Upon the termination of the signal from the tape unit, the unit 20 automatically reselects the receiver signal and the initial illumination pattern for front 20 reappears.

If the operator wishes to utilize the manual mode of operation, he simply moves his finger within half an inch of LED 26D. The proximity of the operator's finger to LED 26D causes the unit 20 to switch from the automatic mode to the manual mode as will be indicated by the disappearance of the caption AUTOMATIC and the illumination of the caption MANUAL. Assuming now that all three audio sources are connected and available, the operator may select any one of them by simply moving his finger into proximity with LED 26A, 26B or 26C to select, respectively, channel 1, 2 or 3 which will then be indicated by the illumination of the appropriate numeral and the de-energization of the associated LED 26A, 26B or 26C. To return again to the automatic mode, the operator again moves his finger into proximity with LED 26D.

The unit 20 is also adapted to be connected to a remote control panel which permits the utilization of the above described operating modes by means of the remote panel.

Figure 2:
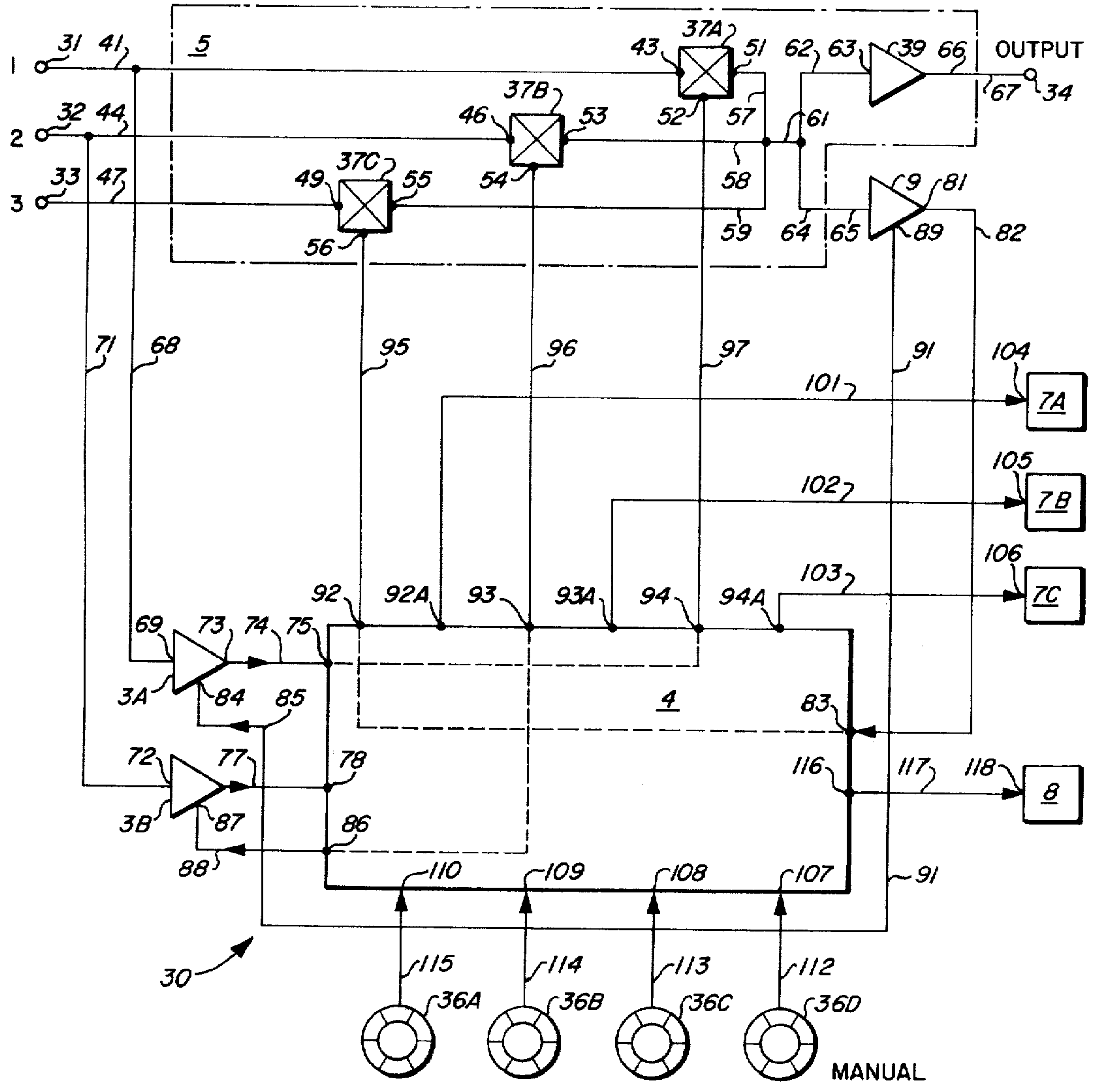
FIG. 2 is a block diagram of the electronic system which provides the automatic control functions.

FIG. 2 discloses in block diagram form the electronic system 30 which is located inside cabinet 21 and which is utilized by unit 20 to provide the operating modes described above. System 30 of FIG. 2 comprises CHANNEL 1, 2 and 3 input terminals 31, 32 and 33, respectively, output terminal 34 for connection to a video display and speaker system, signal sensing circuits 3A and 3B, a selection and memory matrix 4, a signal switching network 5, a third signal sensing circuit 9, lamp driver circuits 7A, 7B, 7C and 8, and proximity switches 36A, 36B, 36C and 36D.

Within circuit block 5, which has been indentified as the audio switching network, are three electronic switches 37A, 37B and 37C, and an amplifier 39.

In FIG. 2, signals from channels 1, 3 and 2 are connected at input terminals 31, 33 and 32, respectively, and are carried by lines 41, 44 and 47 to input terminals 43, 46 and 49, respectively of electronic switches 37A, 37B, and 37C.

Each of the electronic switches 37A, 37B and 37C has an input terminal, an output terminal and a control terminal. Switch 37A for example has in addition to its input terminal 43 an output terminal 51 and a control terminal 52. If the control terminal 52 is grounded, the signal present at input terminal 43 is transmitted to output terminal 51; if control terminal 52 is not grounded, the signal is not transmitted to the output terminal. Switch 37B has an output terminal 53 and a control terminal 54 and switch 37C has an output terminal 55 and a control terminal 56.

The output terminals 51, 53 and 55 of switches 37A, 37B and 37C are connected via lines 57, 58 and 59, respectively, to a common signal bus 61 from which connection is made by line 62 to input terminal 63 of amplifier 39 and by line 64 to input terminal 65 of signal sensor 9. Output terminal 66 of amplifier 39 is connected by line 67 to output terminal 34. Assuming there are signals present at input terminals 43, 46 and 49 of all three switches 37A, 37B and 37C, respectively, it is possible to select any one of the three signals and transmit it to bus 61 by grounding the appropriate control terminal 52, 54 or 56.

The signal sensors 3A, 3B and 9, matrix 4 and switches 37A, 37B and 37C cooperatively provide the automatic selection function. The amplified signal from line 41 is connected via line 68 to input terminal 69 of signal sensor 3A and the signal from line 44 is connected via line 71 to input terminal 72 of signal sensor 3B. Output terminal 73 of sensor 3A is connected by line 74 to terminal 75 of matrix 4, output terminal 76 of sensor 3B is connected by line 77 to terminal 78 of matrix 4 and output terminal 81 of sensor 9 is connected by line 82 to terminal 83 of matrix 4. Audio sensor 3A has an enable terminal 84 which is connected by line 85 to terminal 86 of matrix 4 and sensor 3B has an enable terminal 87 which is connected by line 88 to terminal 86 of matrix 4. A positive voltage level at terminal 86 and thus at enable terminals 84 and 87 disables sensors 3A and 3B while a zero or ground level at terminals 86, 84 and 87 causes sensors 3A and 3B to be enabled. In the enabled condition, sensor 3A or 3B responds to the presence of an audio signal at its input terminal by delivering a positive signal at its output terminal while in the disabled condition the output terminal will be at ground potential regardless of the presence or absence of a signal at the input.

Signal sensor 9 operates in a different manner. The absence of a signal rather than the presence of a signal at input terminal 65 of sensor 9 produces a positive signal at output terminal 81 when enable terminal 89 is grounded. Enable terminal 89 is connected to terminal 86 of matrix 4 by line 91. Sensors 3A, 3B and 9 are thus simultaneously enabled by a ground signal at terminal 86 or disabled by a positive signal at terminal 86, the ground signal being present when the automatic mode is set and the positive signal being present when the manual mode is set.

Assuming now that the automatic mode is set and that sensors 3A, 3B and 9 are enabled, automatic selection of the signal source occurs in the following manner: When the equipment is first energized, there is initially no signal present on bus 61 or input terminal 65 of sensor 9 and the resulting positive signal present at output terminal 81 of sensor 9 is delivered by line 82 to terminal 83 of matrix 4. The positive signal present at terminal 83 causes terminal 92 of matrix 4 to be grounded. Terminal 92 is connected by line 95 to control terminal 56 of switch 37C and terminal 56 is thus also grounded thereby enabling switch 37C so that the CHANNEL 2 output signal which by way of example might originate from a TV receiver is transmitted via switch 37C to bus 61 and amplifier 39 for delivery to output terminal 34. If channel 1 which is perhaps a video-audio tape player is now energized and a signal from the tape appears at input terminal 31 and consequently on lines 41 and 68, sensor 3A responds by delivering a positive signal to terminal 75 of matrix 4. The positive signal at terminal 75 of matrix 4 causes terminal 94 to be grounded. By virtue of line 97 connecting terminal 94 of matrix 4 to control terminal 52 of switch 37A, terminal 52 is also grounded, switch 37A is consequently enabled and the tape signal from terminal 31 passes through switch 37A, line 57, bus 61 and amplifier 39 to output terminal 34. At the same time, the positive signal at terminal 75 causes terminals 92 and 93 to rise to a positive value, which positive value is present also at terminals 54 and 56 of switches 37B and 37C, respectively, causing switches 37B and 37C to be disabled or turned off so that only the signal from the tape connected as channel 2 reaches bus 61.

A signal applied at terminal 32 rather than at terminal 31 causes a similar response. In this case, sensor 3B delivers a positive signal to terminal 78 thereby causing terminal 93 to be grounded and terminals 92 and 94 to go positive. The grounding of terminal 93 and the consequent enabling of switch 37B allows the signal from terminal 32 to pass through line 44, switch 37B, line 58, bus 61, line 62, amplifier 39 and line 67 to output terminal 34.

Now upon the cessation of the signal at line 31 or 32, sensor 9 responds to the absence of a signal at its input terminal 65 by delivering after a delay period a positive signal at its output terminal 81, which positive signal is delivered via line 82 to terminal 83 of matrix 4. The positive signal at terminal 83 causes terminal 92 to be grounded and terminals 93 and 94 to rise in a positive level. By virtue of its connection to terminal 92 by line 95, control terminal 56 of switch 37C is grounded, switch 37C is enabled and the receiver signal from terminal 33 passes through line 47, control 38B, line 48, switch 37C, line 59, bus 61, line 62, amplifier 39 and line 67 to output terminal 34.

Associated with each of the three terminals 92, 93 and 94 of matrix 4 are three complementary terminals 92A, 93A and 94A, respectively. When one of the three terminals 92, 93 or 94 is grounded, its complementary terminal rises to a positive voltage and the positive voltage at 92A, 93A or 94A is transmitted to lamp driver 7A, 7B or 7C via lines 101, 102 or 103, respectively. Thus, for example, when terminal 93 is grounded to select channel 2, line 92A is positive and the positive level is carried to input terminal 104 of lamp driver 7A. Lamp driver 7A responds by illuminating the numeral 2 and extinguishing LED 26B. At the same time, grounded terminals 93A and 94A transmit zero voltage signals via lines 102 and 103 to inputs 105 and 106 of lamp drivers 7B and 7C to prevent illumination of the numerals 1 and 3.

Proximity switches 36A, 36B, 36C and 36D, which are located adjacent LED's 26A, 26B, 26C and 26D, respectively, permit manual operation of system 30. If the system is initially in the automatic mode and the operator moves his finger within one half inch of proximity switch 36D, a low energy signal is coupled into the switch 36D from the operator's body, the signal being transmitted to terminal 107 of matrix 4 via line 112. The signal delivered to terminal 107 is amplified and processed to cause terminal 86 to rise to a positive level to disable sensors 3A, 3B and 9. At the same time, a positive voltage signal appears at terminal 116 of matrix 4 and is delivered via line 117 to input terminal 118 of lamp driver 8 to cause the caption MANUAL to be illuminated on front panel 25 and causing the caption AUTOMATIC to be extinguished.

The system is thus placed in the manual mode and it is possible now to switch manually to the desired signal source by moving a finger within one half inch of the appropriate LED or proximity switch. Thus, for example, to switch to channel 1, the operator moves his finger near LED 26A and proximity switch 36A. By virtue of electronic circuits within matrix 4 a ground signal appears at terminal 94 to enable switch 37A. As in the automatic mode when terminal 94 is driven to a zero level, terminals 92 and 93 are driven to a positive level and switches 37B and 37C are turned off. At the same time, terminal 94A rises to a positive level and terminals 92A and 93A are grounded thus delivering the appropriate signals to lamp drivers 7A, 7B and 7C.

While the overall operation of system 30 has now been described with reference to FIG. 2, additional clarity will be added by descriptions which are to follow and which deal in greater detail with the individual parts or circuit blocks of FIG. 2.

Figure 3:
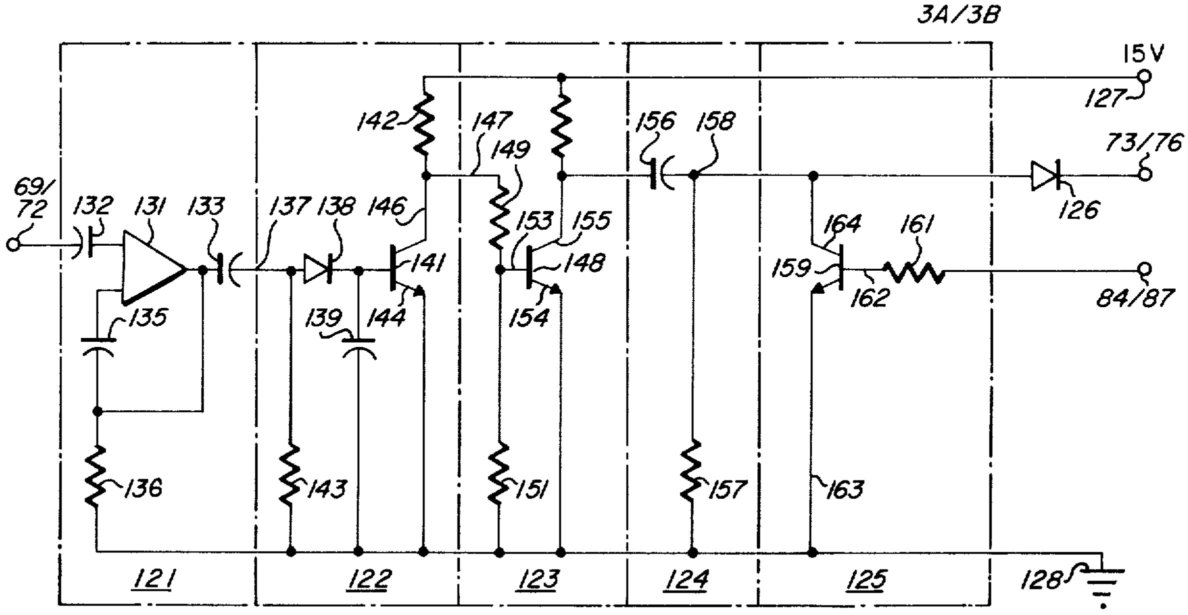
FIG. 3 is a circuit diagram of a signal sensing circuit employed in the invention and which is represented in FIG. 2 by reference numbers 3A and 3B.

The signal sensing circuit 3A, 3B shown in FIG. 3 comprises an input terminal 69/72, an amplifier stage 121, a detector stage 122, an inverter-amplifier stage 123, a differentiator 124, an enable network 125, a +15 volt supply terminal 127, an output terminal 73/76, an enable terminal 84/87 and a ground terminal 128. In the case of a video-audio source connected at terminal 69/72, the video portion of the signal is the preferred signal to be monitored rather than the audio portion of the signal because of the higher degree of signal continuity.

Amplifier stage 121 utilizes an integrated circuit amplifier 131 which may be an RCA 3048, an input coupling capacitor 132 and output coupling capacitor 133 and a feedback network comprising capacitors 134 and 135 and resistor 136.

The output signal from amplifier stage 121 is coupled through capacitor 133 to the input terminal 137 of detector state 122 which comprises a diode 138, a capacitor 139, a transistor 141 and resistors 142 and 143. Resistor 143 is connected between the input terminal 137 and ground terminal 128 to provide a path to ground for d-c leakage current through capacitor 133 of amplifier stage 121 and thereby to insure that input terminal 137 is substantially at ground potential in the absence of an input signal. Diode 138 and capaictor 139 are serially connected between input terminal 137 and ground terminal 128, the series combination serving as a detector/integrator network as diode 138 conducts only during the positive half cycle of the a-c audio signal appearing at input terminal 137. Transistor 141 has its emitter 144 connected to ground terminal 128, its base 145 connected to the positive terminal of capacitor 139 and its collector 146 connected through resistor 142 to 15 volt supply terminal 127. At the initiation of a signal appearing at input terminal 137, capacitor 139 begins to charge through diode 138, very quickly charging to a voltage which is adequate to forward bias the base emitter junction of transistor 141 and causing a current to flow from base 145 to emitter 144 thereby switching transistor 141 to an "on" state wherein transistor 141 exhibits a low impedance from collector 146 to emitter 144. As transistor 141 switches to the "on" state the voltage at collector 146 and at output terminal 147 which is connected to collector 146 falls from a high positive value to just a fraction of a volt above ground or zero potential. Collector 146 and output terminal 147 remain near ground potential as long as a signal persists at input terminal 137 and because of the excess charge developed on capacitor 139 which continues to supply base emitter current. After the signal disappears, transistor 141 remains in an "on" state for as long as 45 seconds after the signal is gone. The delay thus provided by capacitor 139 prevents the sensing circuit from responding to short interruptions in the signal appearing at input terminal 69/72.

Inverter-amplifier state 123 comprises a transistor 148 and three resistors 149, 151 and 152. Resistor 151 is connected between base 153 and grounded emitter 154 of transistor 148, resistor 149 is connected between output terminal 147 of stage 122 and base 153 of transistor 148, and resistor 152 is connected from +15 volt supply terminal 127 to collector 155 of transistor 148. In the absence of a signal at input terminal 69/72 or when transistor 141 is turned off, terminal 147 is at a high positive value and a current flows from terminal 147 through resistor 149 to base 153 and from base 153 to emitter 154 of transistor 148 to ground terminal 128, the base emitter current setting transistor 148 to its "on" state and thereby causing the collector 155 to be at a low voltage near ground potential. When a signal appears at terminal 69/72 and when transistor 141 consequently turns on, terminal 147 falls to a low value of voltage and no longer supplies emitter base current through resistor 149. As a result, transistor 148 "turns off" and the voltage at collector 155 rises rapidly to a high value.

Differentiator 124 comprises a series network including a capacitor 156 and a resistor 157, the free end of the capacitor being connected to collector 155 of transistor 148 and the free end of resistor 157 being connected to ground terminal 128. The voltage across resistor 157 and hence at differentiator output terminal 158 which is at the junction of capacitor 156 and resistor 157 is the differential of the voltage applied to differentiator 124 by collector 155 of transistor 141. As indicated earlier the voltage at collector 155 rises rapidly from near zero to a relatively high positive value. The differential of such a voltage transition is a positive pulse of voltage which appears at terminal 158, and a part of the energy developed in this positive pulse is delivered as a current pulse flowing from terminal 158 through diode 126 to sensor output terminal 73/76.

Enable circuit 125 comprising transistor 159 and resistor 161 completes the sensor circuit 3A/3B. Resistor 161 is connected between enable terminal 84/87 and base 162 of transistor 159, emitter 163 of transistor 159 is connected to ground terminal 128, and collector 164 of transistor 159 is connected to differentiator output terminal 158. When a positive signal is applied at enable terminal 84/87 a current flows from terminal 84/87 through resistor 161 to base 162 and from base 162 to emitter 163 and ground terminal 128, the base emitter current turning transistor 159 on and effectively shorting terminal 158 to ground through the low impedance, collector to emitter of transistor 159. In this condition, the sensor circuit is disabled because transistor 159 prevents the delivery of an output pulse to terminal 73/76. When terminal 84/87 is at or near ground potential no base emitter current is supplied to transistor 159 through resistor 161, transistor 159 is thus turned off and the sensor circuit 3A/3B is thus enabled and capable of responding to an input signal at terminal 69/72.

Figure 4:
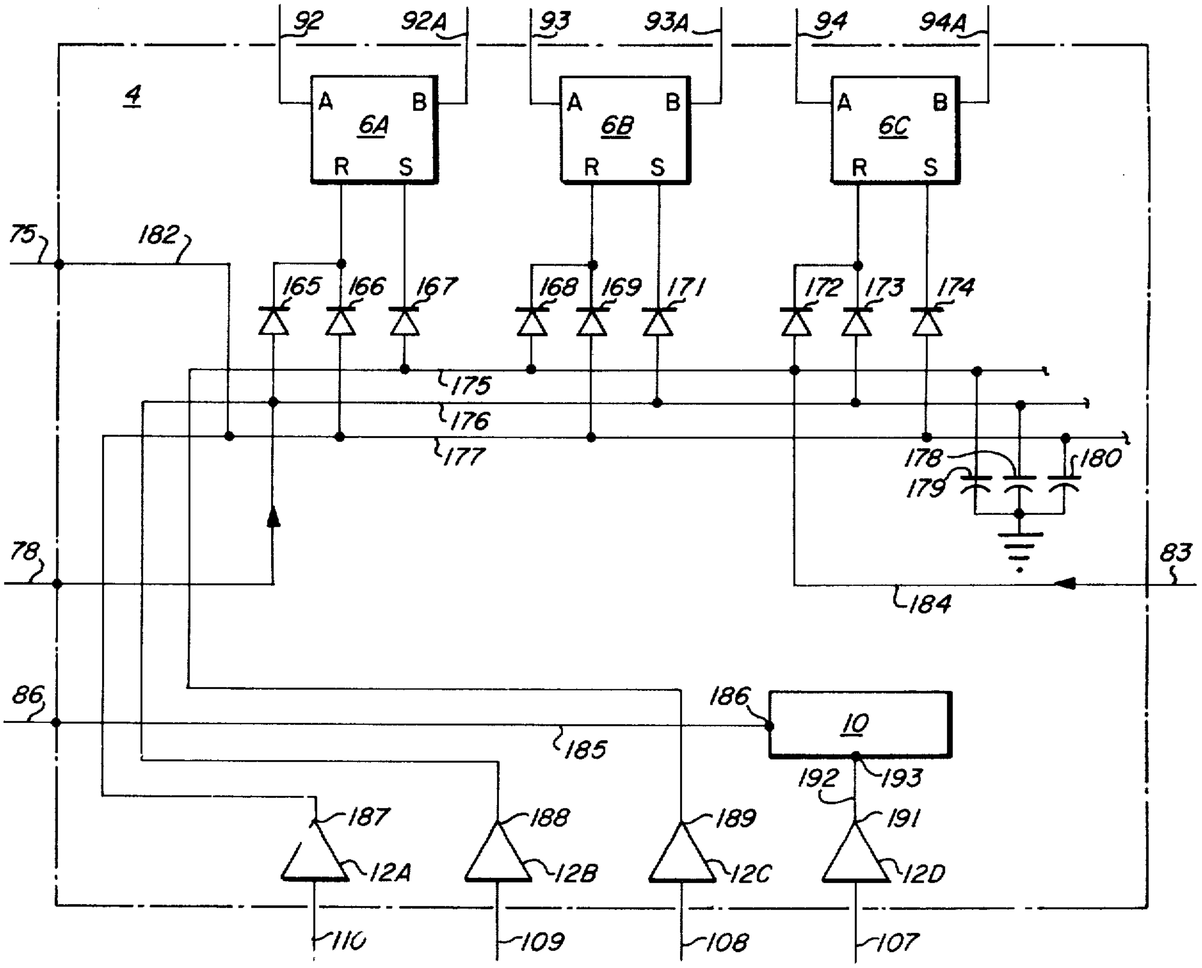
FIG. 4 is a wiring diagram including circuit elements and larger circuit blocks and their interconnections in a selection and memory matrix shown as circuit block 4 of FIG. 2.

Internal features of matrix 4 are shown in FIG. 4 to include three set/reset flip-flops 6A, 6B and 6C, each having complementary output terminals A and B and each having a "set" input S and a "reset" input R, the "set" and "reset" inputs being driven through a diode matrix comprising diodes 165, 166, 167, 168, 169, 171, 172, 173, and 174, a channel 1 bus 177, a channel 3 bus 176, a channel 2 bus 175, capacitors 178, 179, and 180, one end of each being connected to ground terminal 128, the other end to one of the buses 175, 176 and 177 so that each of the three buses has a capacitor to ground, four proximity amplifiers, 12A, 12B, 12C and 12D, amplifier 12A driving bus 177, amplifier 12B driving bus 176, amplifier 12C driving bus 175, and amplifier 12D driving an automatic/manual flip-flop 10.

Input terminals 75, 78 and 83 of matrix 4 are connected respectively to channel 1 bus 177, channel 3 bus 176 and channel 2 bus 176 by respective connecting lines 182, 183 and 184. Output terminal 86 is connected by line 185 to output terminal 186 of flip-flop 10. The A and B outputs of flip-flop 6A correspond respectively to output terminal 92 and 92A, the A and B outputs of flip-flop 6B correspond respectively to output terminals 93 and 93A, and the A and B output terminals of flip-flop 6C correspond respectively to output terminals 94 and 94A of matrix 4. Input terminals 110, 109, 108 and 107 are connected respectively to the input terminals of proximity amplifiers 12A, 12B, 12C and 12D.

Flip-flop 6A has two states, a "set" state and a "reset" state. In the "set" state, the A output is low (near ground potential) and the B output is high (at a positive potential) while in the "reset" state, the A output is high and the B output is low. Th state can be changed from "reset" to "set" by applying a positive pulse to input terminal S or from "set" by applying a positive pulse to input terminal R. If the flip-flop is already in the "set" state, a positive pulse at the S input has no effect and a positive pulse at the R input has no effect if the "reset" state already exists. Flip-flops 6B and 6C are identical to flip-flop 6A.

The flip-flops 6A, 6B and 6C are set or reset by positive signals appearing on buses 175, 176 and 177, the positive signals being supplied in the automatic mode from input terminals 75, 78 and 83 and in the manual mode by the output terminals 187, 188 and 189, respectively, of amplifiers 12A, 12B and 12C. A positive pulse on bus 175, for example, is passed by diode 167 to the S input of flip-flop 6A, it is passed by diode 168 to the R input of flip-flop 6B, and by diode 172 to the R input of flip-flop 6C. Flip-flop 6A is thus "set" and flip-flops 6B and 6C are "reset." It is to be noted that from each of the three buses 175, 176 and 177, there are three diodes connected, one carrying a "set" pulse to one of the three flip-flops 6A, 6B and 6C, the other two diodes carrying reset pulses to the other two flip-flops. Thus, diode 167 is connected from bus 175 to the S input of flip-flop 6A, diode 171 is connected from bus 176 to the S input of flip-flop 6B, diode 174 is connected from bus 177 to the S input of flip-flop 6C, diodes 165 and 166 are respectively from buses 176 and 177 to the R input of flip-flops 6A, diodes 168 and 169 are connected respectively from buses 175 and 177 to the R input of flip-flop 6B and diodes 172 and 173 are connected respectively from buses 175 and 176 to the R input of flip-flop 6C. It is thus seen that a positive pulse on any one of the three buses 175, 176 or 177 will set one of the three flip-flops 6A, 6B or 6C and it will reset the other two, this being the operation described earlier as required to enable one of the switchers 37A, 37B or 37C and to disable the other two.

The proximity amplifiers 12A, 12B, 12C and 12D receive very low level a-c signals at their input terminals from terminals 110, 109, 108 and 107, respectively, which are connected to the proximity switches 36A–36D shown in FIG. 2, the a-c signals being capacitively coupled to switches 36A–36D from the operator's body as he moves his finger near the switches. In response to these low level a-c signals, the proximity amplfiers deliver positive pulses to buses 175, 176 and 177 or to flip-flop 10. Thus, for example, if the operator moves his finger near proximity switch 36A and a-c signal is coupled through terminal 110 to the input of amplifier 12A and amplifier 12A supplies a positive pulse from its output terminal 187 its output terminal 187 to bus 177.

An a-c signal at terminal 107 which is connected to the input terminal amplfier 12D produces a positive pulse at output terminal 191 of amplifier 12D, output terminal 191 being connected by line 192 to input terminal 193 of flip-flop 10. The operating characteristics of flip-flop 10 are such that each succeeding positive pulse appearing at input terminal 193 changes the state of flip-flop 10 so that the signal level at output terminal 186 is changed from a "zero" or low state to a "one" or high state or from a high state to a low state, the low state corresponging to the automatic mode in which the low signal delivered at output 186 and delivered to output terminal 86 by line 185 enables the audio sensors 3A, 3B and 9 while a high signal delivered to terminal 86 corresponding to the manual mode disables the audio sensors.

Figure 5:
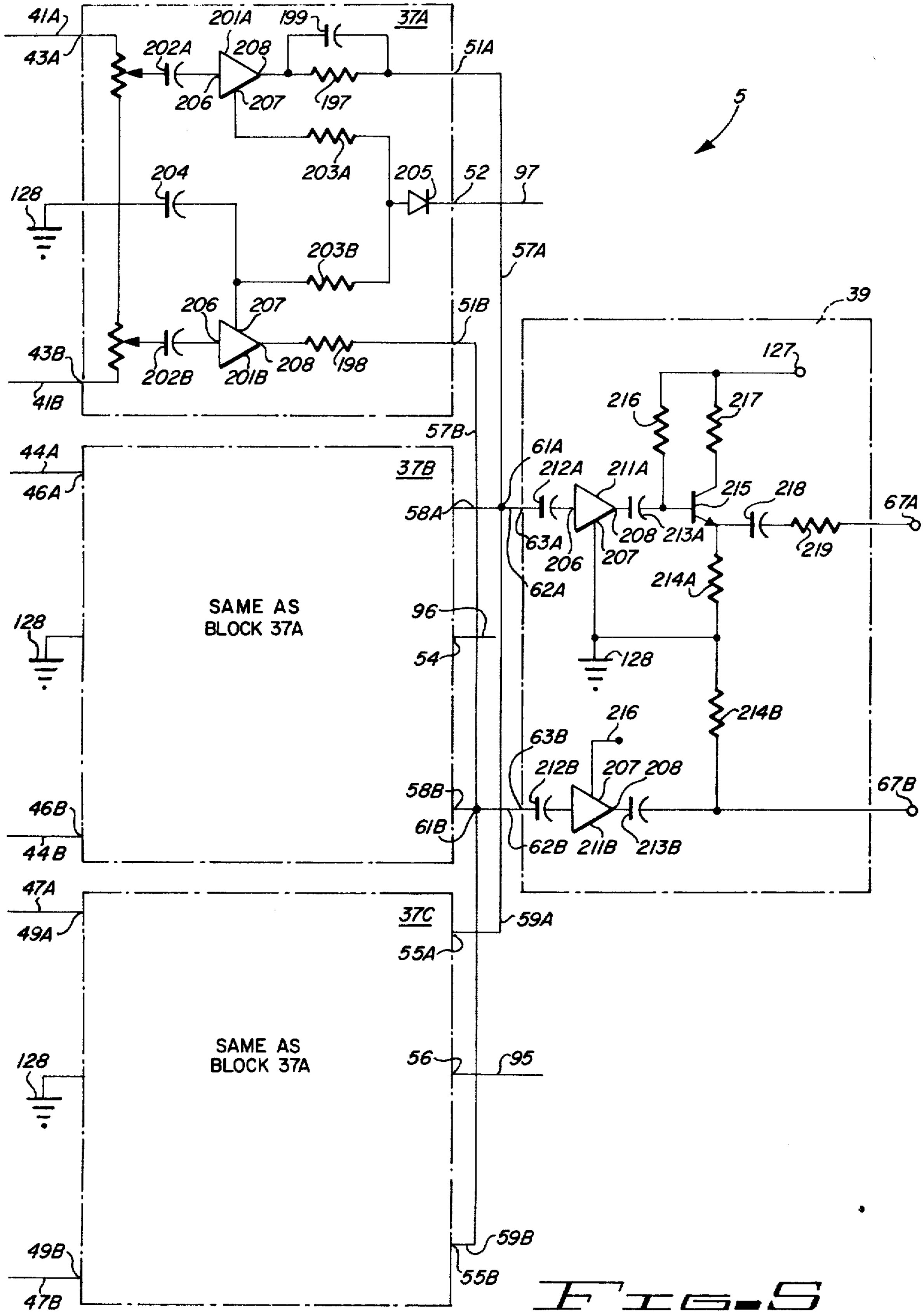
FIG. 5 is a circuit diagram of the switching network which is shown as circuit block 5 of FIG. 2.

Although FIG. 2 appears to show only single line signal channels, the system is intended to be adaptable to video-audio, stereo or other multi-channel signal sources as well as has been so implemented in the first embodiment. FIG. 5 shows the actual circuit configuration of the switching network which is identified by the number 5 in FIG. 2. It will be noted that for each signal line shown in FIG. 2 there are two corresponding signal lines in FIG. 5. Thus, for example, signal line 41 of FIG. 2 represents signal lines 41A and 41B of FIG. 5. Lines 57, 58, 59 61, 62, 64 and 67 in FIG. 2 similarly represent pairs of lines in FIG. 5 such as 57A and 57B, 58A and 58B, etc. The same correspondence holds for input and output terminals such as, for example, the single input terminal 43 shown in FIG. 2 and the dual terminals 43A and 43B in FIG. 5. In the implementation shown in FIG. 5, the upper channel which has components, lines and terminals identified by an "A" suffix is a video channel while the lower channel associated with the "B" suffixes is an audio channel. Internal details of the switches 37A, 37B and 37C are shown in FIG. 5 to include in each switch two amplifiers 201A and 201B, two input coupling capacitors, 202A and 202B, two ground terminal resistors 203A and 203B, a ground terminal capacitor 204, a grounding diode 205, and isolation networks comprising resistors 197 and 198 and capacitor 199. Amplifiers 201A and 201B are commercially available as integrated circuit packages such as the one manufactured by Motorola, a part number MFC6040. Each of the amplifiers 201A and 201B has one input terminal 206, a ground terminal 207 and an output terminal 208. Feedback and frequency compensating networks are not shown.

The grounding network including capacitor 204, resistors 203A and 203B and diode 205 is employed to control the operation of the switch 37A, 37B or 37C causing it to pass or block the signals appearing at the input lines 41A and 41B, 44A and 44B or 47A and 47B. Consider, for example, switch 37A; unless control line 97 is grounded, there is no direct current path to ground from ground terminals 207 of amplifiers 201A and 201B which are then as a consequence inoperative and not capable of passing signals from input to output terminals. When line 97 is grounded, however, by terminal 94 of matrix 4, ground currents flow from ground terminals 207 through resistors 203A and 203B, diode 205 and line 97 to terminal 94. While the grounding of these terminals could have been effected without the use of the series resistors 203A and 203B, these resistors and the capacitor 204 connected from ground terminal 207 of amplifier 201B to ground terminal 128 have been provided to prevent the occurence of a large "popping" sound during the operation of switch 37A.

Amplifier 39 is also shown in FIG. 5 to have two channels rather than one as suggested in FIG. 2, the dual channel amplifier 39 having an upper video channel and a lower audio channel, the video channel having an input terminal 63A, an input coupling capacitor 212A, an integrated circuit amplifier 211A, coupling capacitor 213A, an emitter-follower amplifier comprising NPN transistor 215 with its emitter resistor 214A, its base resistor 216 and its collector resistor 217, its base and collector resistors being connected to +15 V source 127, and an output coupling network comprising capacitor 218 and resistor 219 connected to video output terminal 67A, and the audio channel having an input terminal 63B, an input coupling capacitor 212B, an integrated circuit amplifier 211B, an output coupling capacitor 213B, a terminating resistor 214B and an audio output terminal 67B. Amplifiers 211A and 211B are again typified by Motorola's MFC6040.

Figure 6:
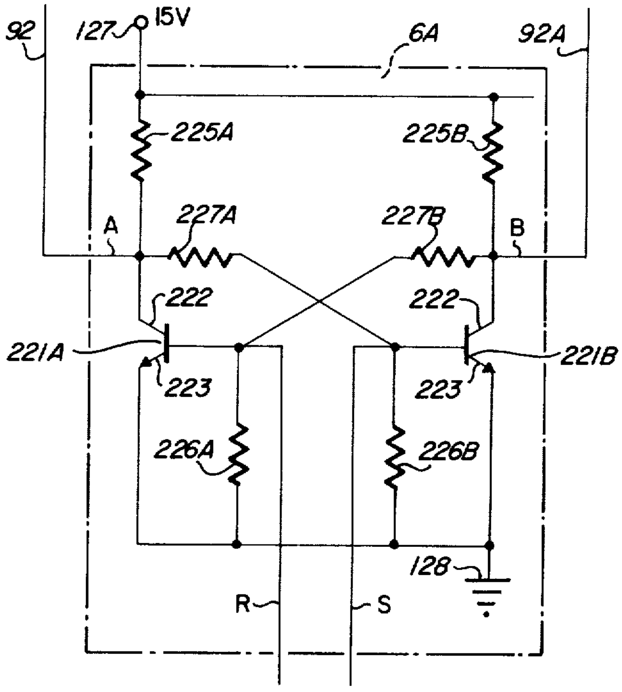
FIG. 6 is a circuit diagram of a Set/Reset flip-flop which is employed in the Selection and Memory Matrix of FIG. 4 and which is represented in FIG. 4 by circuit blocks 6A, 6B and 6C.

FIG. 6 shows a typical flip-flop of the type employed as flip-flop 6A, 6B, or 6C in FIG. 4. Flip-flop 6A includes, as shown in FIG. 6, two transistors 221A and 221B each having a collector 222, an emitter 223 and a base 224, two collector resistors 225A and 225B, two base emitter resistors 226A and 226B and two coupling resistors 227A and 227B. Emitters 223 of transistors 221A and 221B are connected directly to ground terminal 128. Resistor 225A is connected between +15 volt supply terminal 127 and collector 222 of transistor 221A and resistor 225B is connected between terminal 127 and collector 222 of transistor 221B. Resistor 226A is connected between base 224 and emitter 223 of transistor 221A and resistor 226B is connected between base 224 and emitter 223 of transistor 221B. Coupling resistor 227A is connected between collector 222 of transistor 221A and base 224 of transistor 221B while coupling resistor 227B is connected between collector 222 of transistor 221B and base 224 of transistor 221A.

The flip-flop of FIG. 6 has two stable states. In the first state, transistor 221A is "on" while transistor 221B is "off"; in the second state, transistor 221A is "off" and transistor 221B is "on." The first state is here called the "reset" state and the second is the "set" state. Either state is stable because of the cross-coupled resistors 227A and 227B one of which supplies base drive current from the collector of the "off" transistor to the base of the "on" transistor. For example, in the "reset" state, the voltage present at collector 222 of transistor 221B is relatively high because transistor 221B is "off." A current thus flows from collector 222 of transistor 221B through resistor 227B to base 224 of transistor 221A. Because transistor 221A is thus held in the "on" condition, however, the collector 222 of transistor 221A is near ground pontential and no current flows from the collector 222 through resistor 227A to base 224 of transistor 221B.

The flip-flop 6A may be changed from either state to the other by supplying a positive current pulse to the base of the "off" transistor or by supplying a negative pulse to the base of the "on" transistor.

Figure 7:
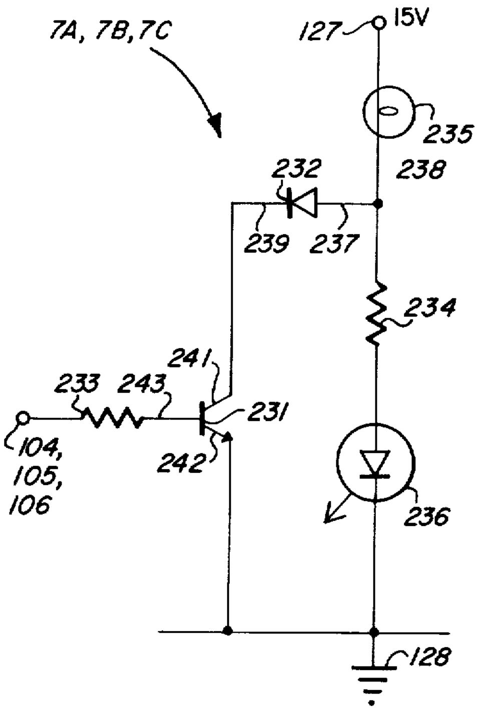
FIG. 7 is a circuit diagram of a lamp driver circuit which is employed in the invention and represented by blocks 7A, 7B and 7C in FIG. 2.

Each of the lamp drivers 7A, 7B and 7C of FIG. 2 has a circuit configuration as shown in FIG. 7, the circuit comprising an NPN transistor 231, a diode 232 and two resistors 233 and 234 which control current through a lamp 235 and the LED 236. The LED 236 represents one of the LED's shown in FIG. 1 as 26A, 26B and 26C.

Serially connected between +15 volt terminal 127 and ground terminal 128 in the order named are lamp 235, resistor 235 and LED 236 with LED 236 polarized to pass current to ground. Connected in parallel with serially connected resistor 234 and LED 236 is a second series network including diode 232 and transistor 231, the anode 237 of diode 232 being connected to common point 238 between resistor 234 and lamp 235, the cathode 239 of diode 232 connected to the collector 241 of transistor 231 and the emitter 242 of transistor 231 connected to ground terminal 128. Resistor 233 is connected between input terminal 104, 105, 106 and base 243 of transistor 231.

Operation of lamp driver 7A, 7B, 7C occurs as follows: When input terminal 104, 105, 106 is grounded, transistor 231 is "off" for want of base current and a small current limited by resistor 234 flows from +15 volt terminal 127 through lamp 235, resistor 234 and through LED 236 to ground terminal 128. The current flowing is too low to cause lamp 235 to be lighted but is adequate to light LED 236. When input terminal 104, 105, 106 is driven positive, however, base drive current flows from terminal 104, 105, 106 through resistor 233 to base 243 and emitter 242 to ground terminal 128. Transistor 231 is thus turned "on" causing the voltage at common point 238 to fall to approximately one volt above ground so that nearly the full 15 volt supply voltage appears across lamp 235. A substantial current thus flows from terminal 127 through lamp 235, diode 232 and transistor 31 to ground terminal 128 so that lamp 235 is fully illuminated while essentially no current flows through resistor 234 and LED 236. Thus, for example, in FIG. 2 when terminal 92 is low to select channel 2, terminal 92A is high and by virtue of line 101 connecting terminal 92A to terminal 104 of lamp driver 7A terminal 104 is also high and the lamp 235 behind the numeral 2 will be energized while the LED 236 or 26B will be extinguished as desired.

Figure 8:
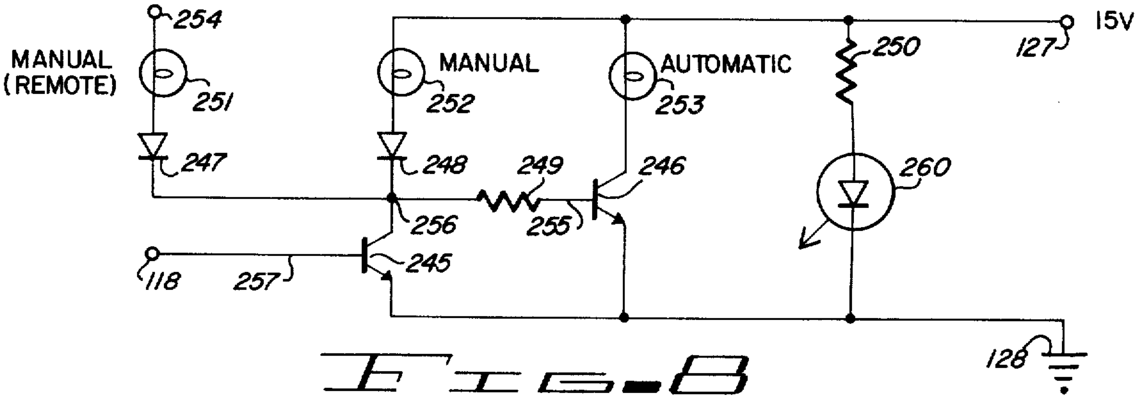
FIG. 8 is a circuit diagram of another lamp driver circuit employed in the invention and shown as circuit block 8 of FIG. 2.

FIG. 8 shows circuit details of automatic/manual lamp driver 8. Lamp driver 8 utilizes two NPN transistors 245 and 246, two diodes, 247 and 248 and resistors 249 and 250 to control the energization of lamps 251, 252 and 253 and of LED 26D, LED 26D identifiying the location of the automatic/manual proximity switch 36D on front panel 25.

LED 26D and resistor 250 are serially connected between supply terminal 127 and ground terminal 128 so that LED 26D is always energized when voltage is present at terminal 127.

Lamp 253 which lights the caption AUTO on front panel 25 is serially connected with transistor 246 between supply terminal 127 and ground terminal 128 so that lamp 253 is energized only when transistor 246 is turned on.

Lamp 252, diode 248 and transistor 245 is serially connected between positive supply terminal 127 and ground terminal 128 while lamp 251, diode 247 and transistor 245 are serially connected between a second positive supply terminal 254 and ground terminal 128. Lamps 251 and 252 are thus energized only when transistor 245 is turned on.

Resistor 249 is connected between base 255 of transistor 246 and collector 256 of transistor 245. When transistor 245 is turned on by means of a positive signal at its base 257 and at control terminal 118, its collector 256 is approximately at the potential of ground terminal 128 so that essentially no current flows from collector 256 through resistor 249 and into base 255 of transistor 246. Transistor 246 is thus turned off when transistor 245 is turned on.

On the other hand, when transistor 245 is turned off by a zero voltage or ground signal at input terminal 118 and base 257, collector 256 rises to a positive voltage approximately equal to the potential of the greater of the two supply terminals 127 and 254 and a small current insufficient in amplitude to illuminate lamp 251 or 252 flows from terminal 127 through lamp 252 and diode 248 to collector 256 or from terminal 254 through lamp 251 and diode 247 to collector 256 and from collector 256 through resistor 249 into base 255 of transistor 246 turning transistor 246 on. Transistor 246 is thus turned on when transistor 245 is turned off.

It has thus been shown that a positive signal at terminal 118 causes transistor 245 to be turned on and lamps 251 and 252 to be energized illuminating the caption MANUAL at the remote panel and at front panel 25 and causing transistor 246 to be turned off and hence lamp 253 to be de-energized. It has also been shown that a ground signal at terminal 118 causes transistor 245 to be turned off thus de-energizing lamps 254 and 252, and turning transistor 246 on thereby energizing lamp 253 to illuminate the caption AUTOMATIC on front panel 25.

The presence of diodes 247 and 248 permits the use of different values of supply voltage at terminals 127 and 254 and different fifferent lamp voltage ratings for lamps 251 and 252.

Figure 9:
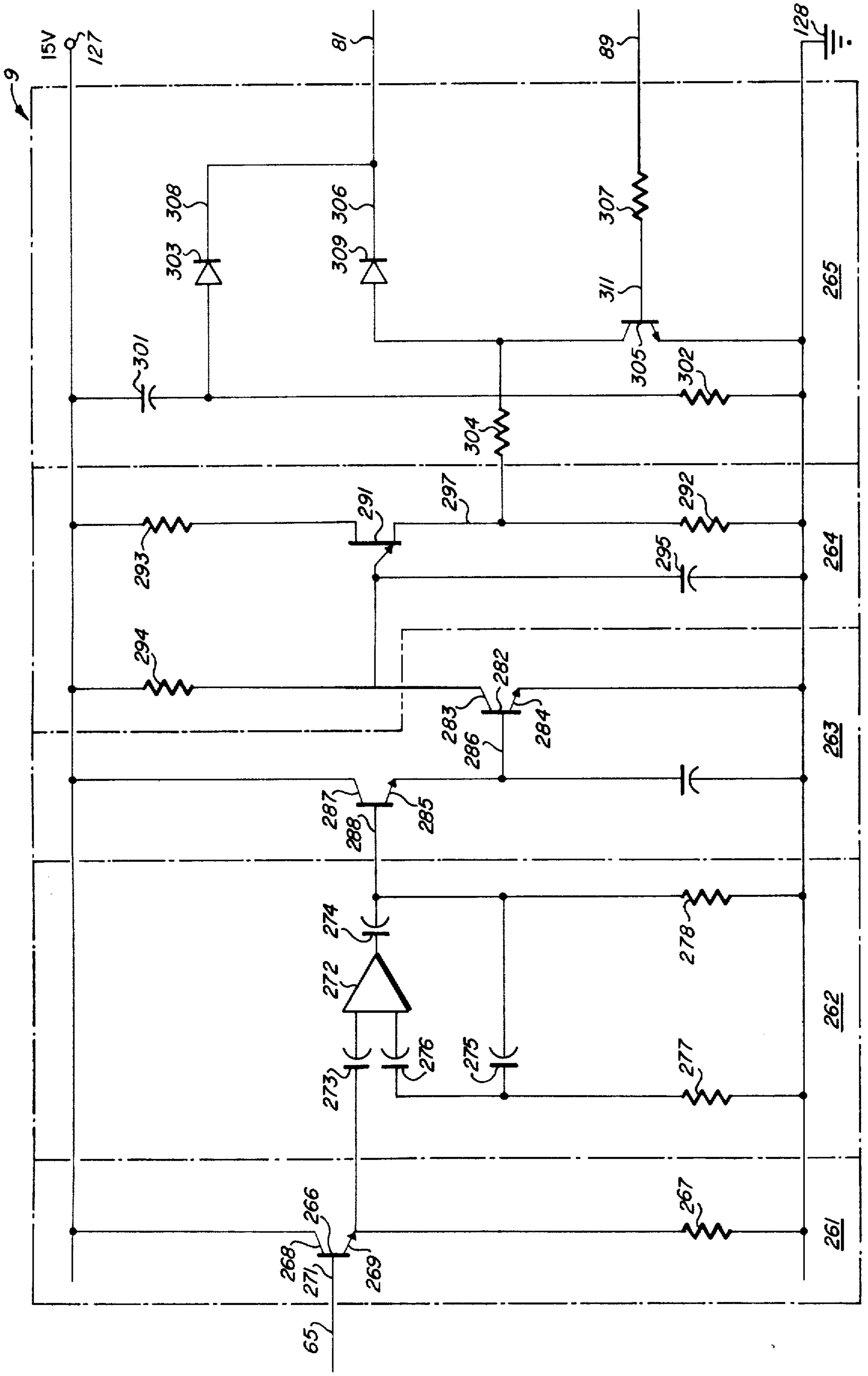
FIG. 9 is a circuit diagram of another sensing circuit employed in the invention and shown as circuit block 9 of FIG. 2.

Signal sensor 9 of FIG. 2 is shown in FIG. 9 to include a detector 261, an a-c amplifier 262, a d-c amplifier 263, a timing circuit 264 and an output stage 265.

Sensor 9 is intended to provide a positive pulse at output terminal 81 when the signal at input terminal 65 dies out for a given period of time provided sensor 9 is enabled by a ground signal to control terminal 89. In addition, sensor 9 is to supply a positive pulse at terminal 81 when voltage first appears at supply terminal 127.

Operation of the circuit in the provision of these functions occurs as follows:

Detector 261 comprises an NPN transistor 266 and a resistor 267 serially connected between emitter 269 and ground terminal 128, with collector 268 of transistor 266 connected to terminal 127. Base 271 of transistor 266 is connected to input terminal 65. When an a-c signal is present at base 271 of transistor 266, emitter 269 tracks the positive half cycles of the a-c signals but during the negative half cycles, the emitter base junction of transistor 266 is reverse biased. Transistor 266 thus provides rectification of the input signal. At the same time, transistor 266 acts as an amplifier supplying most of the load current drawn at emitter 269 by means of collector emitter current so that only a small current flows into base 271 from input terminal 65.

A-c amplifier stage 262 comprises an integrated circuit amplifier 272, input and output coupling capacitors 273 and 274, respectively, a feedback network including capacitors 275 and 276 and resistor 277, and a terminating or loading resistor 278. Amplifier 262 is designed to respond to gross, relatively long term changes in the average signal level. Thus, if a given signal level has been established at the emitter 269 of transistor 266, an average d-c level exists across resistor 267 and an a-c signal operating about the established d-c level is fed into amplifier 272 through input coupling capacitor 273. An amplified a-c current is supplied by amplifier 272 through capacitor 274, developing an a-c signal across terminating resistor 278. When the signal at input terminal 65 goes to zero, the a-c signal across resistor 278 also goes to zero.

D-c amplifier 263 acts as a second detector and provides additional amplification. Amplifier 263 includes two NPN transistors 281 and 282. Transistor 282 acts as an output switch with its collector 283 serving as one contact and with its grounded emitter 284 serving as the other contact. Transistor 281 acts as a driver for transistor 282 with the emitter 285 of transistor 281 connected to the base 286 of transistor 282. The collector 287 and the base 288 of transistor 281 are connected, respectively, to supply terminal 127 and to output coupling capacitor 274 of amplifier 262.

When an a-c signal is developed across resistor 278 of the previous stage 262 current flows during each positive half cycle into base 288 to emitter 285, base 286 and emitter 284 to ground terminal 128. By virtue of the amplification factor of transistor 281, an additional and larger current flows from terminal 127 through transistor 281 (collector 287 to emitter 285) into base 286 and emitter 284 of transistor 282 providing a greatly increased level of base drive to transistor 282. Transistor 282 is thus turned on during each positive half cycle of signal current. When the signal disappears, however, transistors 281 and 282 turn off with resistor 278 holding base 288 at ground potential.

Timing circuit 264 is a conventional relaxation oscillator utilizing a unijunction transistor 291, base 1 and base 2 resistors 292 and 293, respectively, timing resistor 294 and timing capacitor 295. A thorough treatment of the unijunction relaxation oscillator is given on pp. 50–53 of the *General Electric Controlled Rectifier Manual*, first edition, copyright 1960 by the General Electric Co. Very briefly, capacitor 295 is charged by a current flowing through resistor 294 until the voltage across capacitor 295 exceeds approximately six tenths of the voltage supplied at terminal 127. At this level, the capacitor voltage exceeds the threshhold voltage of transistor 291 and capacitor 295 then discharges rapidly by means of a current flowing into emitter 296 to base 297 of transistor 291 and through resistor 292 to ground terminal 128. During the discharge of capacitor 295 a positive pulse is developed across resistor 292.

In the presence of a signal, of course, transistor 282 of the preceeding stage 263 is turned on during the positive half cycles as explained earlier and the capacitor 295 is thus discharged each half cycle of signal voltage so that no appreciable charge is developed. When the signal disappears, however, transistor 282 remains off and the capacitor 295 will charge to the threshhold level in one time constant which is RC product of resistor 294 and capacitor 295. A time constant of approximately 30 seconds is appropriate.

Output stage 265 comprises a start up network including capacitor 301, resistor 302 and diode 303 and a disable network including resistor 304, NPN transistor 305, diode 306 and resistor 307.

Capacitor 301 and diode 303 are serially connected between supply terminal 127 and output terminal 81, the cathode 308 of diode 303 being tied to terminal 81. Resistor 302 is connected from the anode 309 of diode 303 and ground terminal 128. When voltage is first applied to terminal 127, changing current through capacitor 301 develops a positive pulse across resistor 302 and the positive pulse is coupled to output terminal 81 through diode 303.

The positive pulse developed across resistor 292 of previous stage 264 is coupled from base 297 through serially connected resistor 304 and diode 306 to output terminal 81 unless transistor 305 is turned on. Transistor 305 is connected between the anode 309 of diode 306 and ground terminal 128 and its base 311 is connected to enable terminal 89 by resistor 307. When enable terminal 89 is grounded, transistor 305 is off and the pulse is passed through resistor 304 and diode 306 to terminal 81. When terminal 89 is positive, however, as in the MANUAL mode, transistor 305 is turned on and the pulse from base 297 of unijunction transistor 291 flows through resistor 304 and transistor 305 to ground terminal 128.

Figure 10:
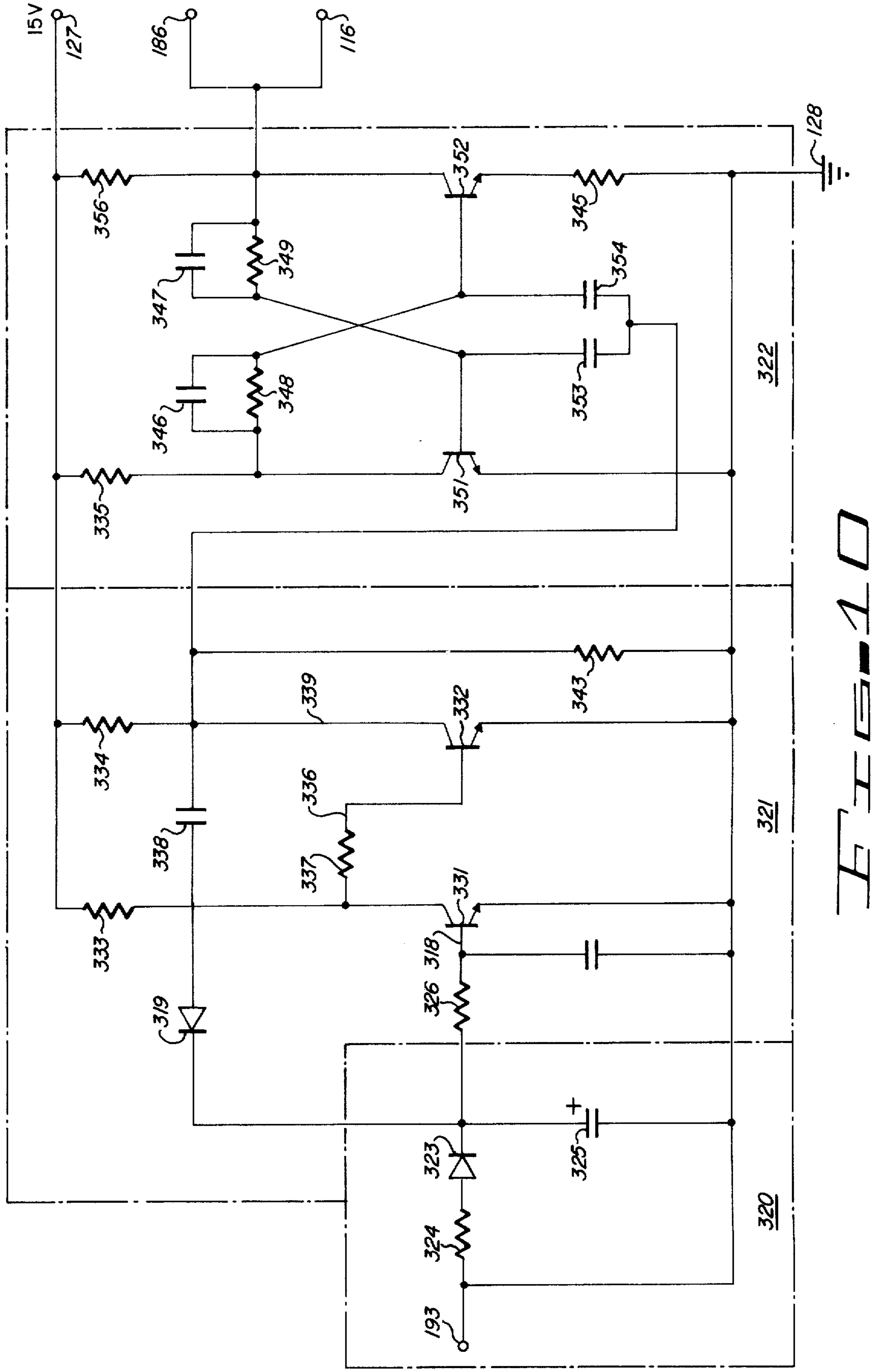
FIG. 10 is a circuit diagram of the automatic/manual control flip/flop employed in the invention and shown as circuit block 10 of FIG. 4.

The automatic/manual flip-flop 10 shown in FIG. 10 comprises a noise suppressor stage 320, an amplifier and pulse shaper 321 and a toggle flip-flop 322.

Suppressor stage 320 includes a threshhold diode 323 and an RC integrator comprising resistor 324 and capacitor 325. Stage 320 suppresses electrical noise which is present on the long lines which are connected at input terminal 193 for delivery of control pulses from the remote control unit. The integrator suppresses high frequency signals. Because the signal delivered through diode 323 and resistor 324 has been reduced and its high frequency components removed by suppressor stage 320, its wave shape and amplitude are no longer appropriate to trigger flip-flop 322. Amplifier and pulse shaper 321 is used to restore the desired shape and amplitude.

Amplifier and pulse shaper 321 includes two grounded emitter NPN transistors 331 and 332 with collector resistors 333 and 334, respectively, tied to supply terminal 127. The collector 335 of the first transistor 331 is coupled to the base 336 of the second transistor by resistor 337, while capacitor 338 and serially connected diode 319 connect collector 339 of transistor 332 to the input of shaper 321 at the junction between base resistor 326 of transistor 331 and diode 323.

When a low amplitude positive signal from suppressor 320 begins to turn transistor 331 on, the voltage at collector 335 begins to fall thereby reducing base drive through resistor 337 to transistor 332. Transistor 332 thus begins to turn off and the voltage at its collector 339 begins to rise. The rise of voltage at collector 339 supports a regenerative current to flow from collector 339 through capacitor 338, diode 319 and resistor 326 into base 318 of transistor 331, the regenerative current causing transistor 331 to switch rapidly to the "on" state. Simultaneously, with the rapid turn on of transistor 331, transistor 332 turns rapidly off, its collector voltage rising to a level determined by the divider network comprising resistors 334 and 343.

Toggle flip-flop 322 is similar to flip-flop 6A of FIG. 6 with the following exceptions; first, it has only one base emitter resistor 345. Second, it has capacitors 346 and 347 connected in parallel with coupling resistors 348 and 349. Fourth, instead of separate "set" and "reset" terminals, flip-flop 222 is "toggled" by a single line 344 which is coupled to the bases of both NPN transistors 351 and 352 by trigger capacitors 353 and 354. As in the case of flip-flop 6A, the collectors of the transistors are connected to supply terminal 127 by collector resistors 335 and 356.

The absence of a base emitter resistor for transistor 351 guarantees that transistor 351 rather than transistor 352 will turn on when the equipment is first energized. The state of flip-flop 322 is immediately changed, however, by a signal generated by pulse shaper 321 due to the initial charging of capacitor 338 so that transistor 352 is then turned on setting a ground level at output terminals 186 and 116 and thereby setting the automatic mode as desired.

Capacitors 346 and 347 are essential to the operation of flip-flop 322 in the "toggle" mode for which it is desired that the flip-flop 322 change its state each time a trigger pulse is injected from line 344. In the presence of the positive trigger pulse applied to the bases of transistors 351 and 352 through trigger capacitors 353 and 354, both transistors 351 and 352 tend to be turned on. As the pulse decays, however, the capacitor 346 and 347 which is connected to the collector or the transistor 351 or 352 which has been turned off has a residual charge which limits the base drive to the transistor which had previously been turned on and thus causes that transistor not to turn on again.

In the overall operation of automatic/manual flip-flop 10 then, each succeeding positive input pulse at terminal 193 causes the output signal at terminal 186 to change state from ground to a positive level or from the positive level back to ground thus setting the manual or the automatic operating mode.

Figure 11:
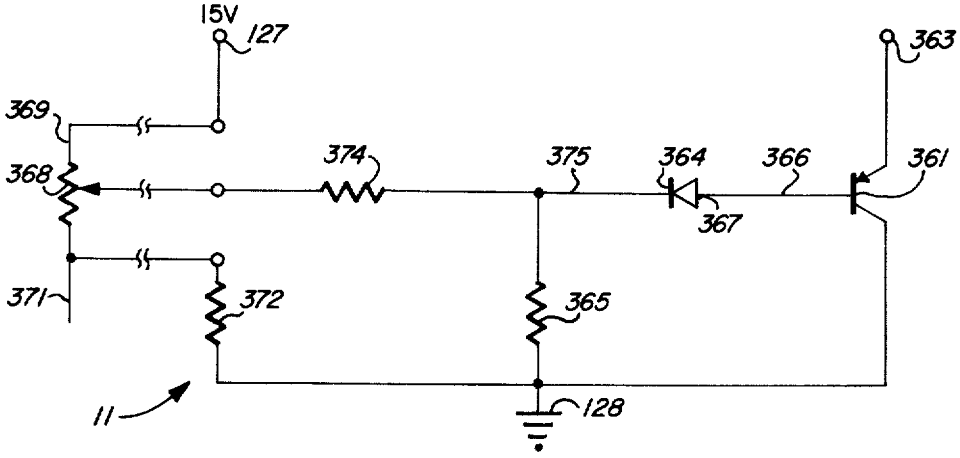
FIG. 11 is a circuit diagram of a remote volume control network designed for use in conjunction with the invention.

The remote volume control circuit 11 is shown in FIG. 11 comprises a grounded collector PNP transistor 361 with its emitter 362 connected to control terminal 363, a diode 364 and a resistor 365 serially connected between the base 366 of transistor 361 and ground terminal 128, the anode 367 of diode 364 being connected to base 366, a potentiometer 368 having its one end 369 connected to source terminal 127, its other end 371 connected through a resistor 372 to ground terminal 128, and its sliding contact arm 373 connected through a resistor 374 to the cathode 375 of diode 364. The potentiometer 368 is located remotely from the rest of the circuit and connecting lines 376, 377 and 378 are thus several feet long. Control terminal 363 is connected to line 216 of amplifier 39 of FIG. 5, its function being to control the volume of amplifier 39 through control of the voltage applied to ground terminal 207 of amplifier 511A and 511B contained within amplifier 39.

Operation of circuit 11 occurs as follows; the resistive network including potentiometer 368 and resistors 372, 374 and 365 connected between supply terminal 127 and ground terminal 128 establishes a variable at cathode 375 of diode 364, the variable voltage being controllable by means of sliding contact arm 373. Because of the high gain of transistor 361 and the relatively low impedance of the above resistive network, the loading effect of connected transistor 361 is negligible and the emitter voltage of transistor 361 and hence the voltage at control terminal 364 tracks the voltage set at cathode 375, the greater part of the ground current injected at terminal 363 passing through transistor 361 directly to ground terminal 128.

Figure 12:
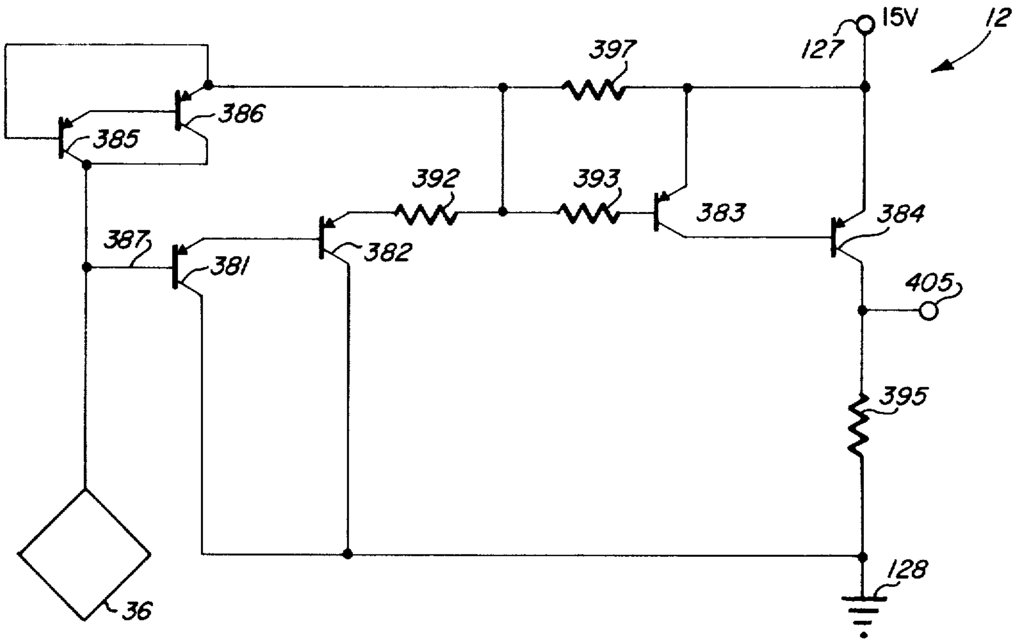
FIG. 12 is a circuit diagram of the Proximity Amplifier, a number of which are employed in the invention and shown as circuit blocks 12A, 12B, 12C and 12D in FIG. 4.

Each of the proximity amplifiers 12A–12D of FIG. 4 has the circuit configuration of amplifier 12 of FIG. 12. The proximity amplifier 12 has four stages of amplification associated with four transistors 381, 382, 383 and 384. The first stage which is associated with transistor 381 is a very high impedance amplifier utilizing in addition to grounded collector PNP transistor 381 two additional PNP transistors 385 and 386 connected to provide a high value of resistance between base 387 and source terminal 127 through resistor 397. Transistor 385 are connected as a Darlington pair, their collectors together and the emitter of transistor 385 connected to the base of transistor 386. The base of transistor 385 is then tied back to the emitter of transistor 386 to effect a biased off condition for the Darlington pair. Connected in this manner transistors 385 and 386 provide a temperature stablized bias current which holds transistor 381 in an "off" condition, the bias current increasing with temperature as required to offset increased leakage current in transistor 381.

Proximity switch 36, which is simply a conductive plane, and base 386 of transistor 381 are thus held at a positive potential relative to ground terminal 128 by transistor 385. When the operator's finger if brought into proximity with switch 36 the positive charge residing on switch 36 and base 387 is momentarily discharged to ground through the stray capacity existing between switch 36 and the body of the operator which is also capacitively coupled to ground. As switch 36 and base 387 thus approach ground potential, transistor 381 is pulsed to an "on" condition, its emitter-to-collector current providing base drive to transistor 382. The resulting emitter collector current of transistor 382 in turn provides base drive to transistor 383 through resistors 392 and 393 and finally, the resulting emitter-to-collector current of transistor 383 is supplied as base drive to transistor 384 which provides the final stage of amplification and delivers a positive output signal to terminal 405 across emitter resistor 395.

The initial bias and threshhold levels for all four transistors 381, 382, 383 and 384 are set by means of a fixed resistor 397 which is serially connected between source 127 and the junction between serially connected resistors 292 and 393.

Figure 13:
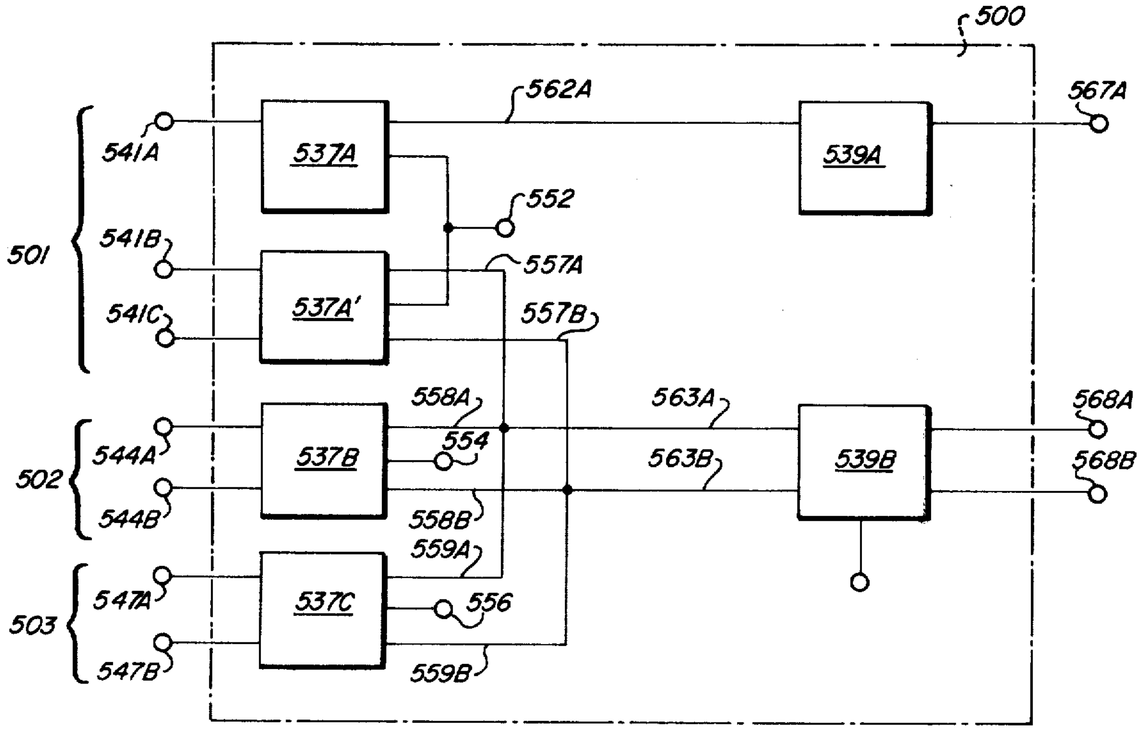
FIG. 13 is a block diagram of a variation of the switching network of FIG. 5 which is adapted to accommodate different types of video and audio sources.

While the foregoing description entailed automatic control and switching between three similar video-audio sources, it will be readily apparent that the same means may be applied to other types of signal sources. FIG. 13 shows, for example, a variation 500 of the switching network 5, the variation of FIG. 13 permitting the automatic selection and switching between a video-stereo-audio source 501 and two stereo-audio sources 502 and 503 not having associated video channels.

To accommodate the video-stereo-audio source 501, network 500 is equipped with three input terminals 541A, 541B and 541C, terminal 541A being provided to receive the stereo signal and terminals 541B and 541C provided to receive the wto audio channels. Switch 537A has a single video channel identical to the upper portion of switch 37A of FIG. 5 while switch 537A' has two audio channels each of which is identical to the lower portion of switch 37A. A common control terminal 552 enables both the video switch 537A and the stereo-audio switch 537A'.

Switches 537B and 537C are identical to stereo audio switch 537A'. Switch 537B is enabled by means of control terminal 554 and 537C is enabled by control terminal 556.

The video output signal from switch 537A is delivered by line 562A to video amplifier 539A, amplifier 539A being identical to the upper portion of amplifier 39. The amplified video output signal from amplifier 39 is delivered at video output terminal 567A.

Audio output signals from switches 537A', 537B and 537C are delivered to stereo audio amplifier 539B by the system of buses including lines 557A, 557B, 558A, 558B, 559A, 559B, 563A and 563B, the A and B suffixes denoting upper and lower (or left and right) stereo channels respectively. Amplifier 539A has two audio amplifier channels each of which is identical to the lower half of amplifier 39. The amplified upper and lower audio signals are delivered to stereo audio output terminals 568A and 568B. Control terminal 516 of amplifier 539B controls the volume of this amplifier in the same manner as the volume is controlled within the lower half of amplifier 39.

Selective grounding of control terminal 552, 54 or 556 thus permits the selection and switching of the video audio source 501 or either of the stereo audio sources 502 or 503.

Again, while it has been assumed in the foregoing descriptions that the output signals are delivered to video display and audio speaker systems, the disclosed control system is equally well adapted for use in selectively coupling signals between multiple input sources to multiple output sources as well, the possible output sources including video and audio recording equipment or video and audio broadcasting equipment.

Extensions and expansions of the equipment described to accommodate quadrophonic signals are also apparent.

From the foregoing detailed description, it will be readily seen that a new and improved automatic control system has been provided for a home as well as commerical entertainment center in accordance with the objects of the invention. While the circuits incorporate numerous features and desirable functions, they may be assembled on printed circuit boards in a very limited space and at a reasonable cost using readily available integrated circuits and other components.

Although but a few embodiments of the present invention have been illustrated and described, it will be apparent to those skilled in the art that various changes and modifications may be made therein without departing from the spirit of the invention or from the scope of the appended claims.

What is claimed is:

1. An automatic electronic control system for an entertainment system utilizing video and audio signal sensors for the preferential selection of a first signal source with means for returning it to a second signal source upon cessation of the signal from said first signal source, said control system comprising:

at least a first pair of input signal terminal means for connection to a preferential first multi-signal source, at least a second pair of input signal terminal means for connection to a second multi-signal source, at least a pair of output terminals for connection to at least a dual channel signal output system, switching means for selectively connecting either said first pair of input signal terminal means or said second pair of input signal terminal means to said output terminals, a first sensing circuit interconnecting said first pair of input signal terminal means and said switching means, said switching means upon energization of said automatic electronic control system connecting said second pair of input signal terminal means to said output terminals, said first sensing circuit upon sensing a signal at said first pair of input signal terminal means generating a control signal to actuate said switching means to connect said first pair of input signal terminal means to said output terminals, said switching means being actuated to reconnect said second pair of signal terminal means to said output terminals upon termination of said signal from said first sensing circuit.

2. The automatic electronic control system set forth in claim 1 wherein:

said first pair of input signal terminal means are provided one for receiving video signals and the other for receiving audio signals, and said first sensing circuit upon sensing a video signal at said first pair of input signal terminal means generating a control signal to actuate said switching means to connect said first pair of input signal terminal means to said output terminals.

3. The automatic electronic control system set forth in claim 1 wherein:

said first pair of input signal terminal means are provided one for receiving video signals and the other for receiving audio signals, and said first sensing circuit upon sensing an audio signal at said first pair of input signal terminal means generating a control signal to actuate said switching means to connect said first pair of input signal terminal means to said output terminals.

4. The automatic electronic control system set forth in claim 1 wherein:

said first pair of input signal terminal means are provided for receiving a pair of stereo audio signals.

5. The automatic electronic control system set forth in claim 1 in further combination with:

means for delaying the actuation of said switching means to reconnect said second pair of signal terminal means to said output terminals for a predetermined interval of time.

6. The automatic electronic control system set forth in claim 1 in further combination with:

a switch connected to said first sensing circuit for controlling the transmission of said control signal of said first sensing circuit to said switching means.

7. The automatic electronic control system set forth in claim 6 wherein:

said switch comprises a proximity switch.

8. The automatic electronic control system set forth in claim 1 in further combination with:

a third input signal terminal means for connection to a second video-stereo-audio preferential signal source, said output terminals comprising three terminals for receiving video-stereo-audio signals, said switching means selectively connecting either of said first, second and third input signal terminal means to said output terminals, a second video sensing circuit interconnecting said third input signal source and said switching means, said second video sensing circuit upon sensing a video signal from said third input signal terminal means generating a signal to actuate said switching means to connect said third input signal terminal means to said output terminals, and means for selectively actuating one of said first and second audio sensing circuits.

9. The automatic electronic control system set forth in claim 8 wherein:

said means for selectively actuating one of said first and second sensing circuits comprises a pair of proximity switches one for each of said first and second sensing circuits.

10. An automatic electronic control system for an entertainment system utilizing video and/or audio signal sensors for the preferential selection of a first signal source with means for returning it to a second signal source upon cessation of the signals from said first signal source, said control system comprising:

first input signal terminals for connection to a preferential first video-audio signal source, second input signal terminals for connection to a second stereo-audio signal source, output signals terminals for connection to a multi-channel output system, a first video sensing circuit comprising input, output and control terminals, a second sensing circuit comprising input, output and control terminals, a switching network having input, output and control terminals, said input terminal of said first video sensing circuit being connected to said first input signal terminals and said output terminals being connected to said input terminals of said switching network, said control terminal of said first video sensing circuit being connected to said control terminal of said control terminal of said second sensing circuit, said input terminal of said second sensing circuit being connected to said output signal terminals and said output terminal of said second sensing circuit being connected to an input terminal of said switching network, switching means for selectively connecting either said first input signal source or said second input signal source through said first and second input signal terminals to said output signal terminals, means for connecting an output terminal of said switching network to said switch means for controlling the transmission of signals from said first and second input signal terminals to said output signal terminals, said switching network upon energization of said control system generating a signal and transmitting it through its output terminal to said switching means to transmit signals on said second signal terminals to said output signal terminals, said first video sensing circuit sensing a video signal at said first input signal terminals and generating a control signal at said input terminal of said switching network, said switching network upon receipt of said control signal of said first video sensing circuit transmitting a signal from one of its output terminals to said switching means to connect said first input signal terminal to said output signal terminals, said second sensing circuit upon termination of signals from said first input signal terminals existing at said output signal terminals transmitting a signal from its output terminal to said switching network to reconnect said second signal input terminals to said output signal terminals and a signal from its control terminal for transmittal to the control terminal of said first video sensing circuit to disable said first video sensing circuit.

11. The automatic electronic control system set forth in claim 10 wherein said switching network comprises:

means for delaying the actuation of said switching means to reconnect said second signal terminals to said output signal terminals for a predetermined interval of time whereby short interruptions of signals on said first input signal terminals will not cause a switching of said control system back to said second input signal terminals.

12. The automatic electronic control system set forth in claim 10 wherein:

said switching network comprises a selection switch for manually energizing said switching means for connecting said first signal terminals to said output signal terminals.

13. The automatic electronic control system set forth in claim 12 wherein:

said selection switch comprises a proximity switch.

* * * * *